US 9,345,939 B2

(12) United States Patent
Fratkin

(10) Patent No.: US 9,345,939 B2
(45) Date of Patent: May 24, 2016

(54) GOLF CLUB COVER

(71) Applicant: Jesse Fratkin, Burnaby (CA)

(72) Inventor: Jesse Fratkin, Burnaby (CA)

( * ) Notice: Subject to any disclaimer, the term of this patent is extended or adjusted under 35 U.S.C. 154(b) by 16 days.

(21) Appl. No.: 14/181,646

(22) Filed: Feb. 15, 2014

(65) Prior Publication Data

US 2015/0231459 A1 Aug. 20, 2015

(51) Int. Cl.
*A63B 57/00* (2015.01)
*A63B 55/00* (2015.01)
*F16M 13/02* (2006.01)
*A63B 71/06* (2006.01)
*H04M 1/725* (2006.01)

(52) U.S. Cl.
CPC .............. *A63B 55/007* (2013.01); *A63B 60/62* (2015.10); *A63B 71/0622* (2013.01); *F16M 13/022* (2013.01); *H04M 1/725* (2013.01); *A63B 2071/0647* (2013.01); *A63B 2220/806* (2013.01); *A63B 2225/09* (2013.01)

(58) Field of Classification Search
CPC ..... A63B 55/007; A63B 60/62; F16M 13/022
USPC ........ 150/160; 306/315.2, 578, 579; 224/918; 206/315.2, 578, 579
See application file for complete search history.

(56) References Cited

U.S. PATENT DOCUMENTS

| | | | | |
|---|---|---|---|---|
| 3,462,862 A | * | 8/1969 | Chase | ....................... G09F 3/12 224/183 |
| 3,574,963 A | | 4/1971 | Rosenow | |
| 3,638,284 A | | 2/1972 | Baker | |
| 4,380,337 A | * | 4/1983 | DiMatteo | ........... A63B 57/0075 40/317 |
| 4,520,855 A | * | 6/1985 | Dien | ..................... A63B 55/007 150/160 |
| 4,822,052 A | * | 4/1989 | Dimmick | ............... A63B 49/08 40/317 |
| 5,244,204 A | * | 9/1993 | Zeller | ................ A63B 57/0075 206/0.82 |
| 5,795,249 A | * | 8/1998 | Johnson | ............. A63B 57/0075 224/918 |
| 5,921,387 A | | 7/1999 | Arzoomanian et al. | |
| 6,513,165 B1 | * | 2/2003 | England | ............. A63B 57/0075 2/160 |
| 6,820,665 B2 | | 11/2004 | Bradshaw | |
| 7,832,438 B2 | | 11/2010 | Cameron | |
| 8,517,850 B1 | | 8/2013 | Beno et al. | |
| 2003/0056866 A1 | | 3/2003 | Sheppard, Jr. | |
| 2003/0173009 A1 | * | 9/2003 | Choe | ......................... G09F 7/04 150/160 |
| 2008/0035255 A1 | | 2/2008 | Wu | |
| 2011/0017618 A1 | * | 1/2011 | Moroney | ............... A63B 57/00 206/234 |
| 2012/0118452 A1 | | 5/2012 | Wagner et al. | |
| 2012/0261043 A1 | | 10/2012 | Yanoff et al. | |
| 2013/0166405 A1 | | 6/2013 | Mitzel et al. | |
| 2014/0038743 A1 | | 2/2014 | Nivanh | |

FOREIGN PATENT DOCUMENTS

| | | |
|---|---|---|
| CA | 1262923 | 11/1989 |
| CA | 2040056 | 10/1992 |
| CA | 2133125 A1 | 3/1996 |
| CA | 2324829 A1 | 6/2001 |
| CA | 2433928 A1 | 7/2004 |
| CA | 2551970 A1 | 1/2007 |

(Continued)

*Primary Examiner* — Sue A Weaver
(74) *Attorney, Agent, or Firm* — Ray Meiers; Endurance Law Group

(57) ABSTRACT

A golf club cover is disclosed herein. The golf club cover includes a body defining a cavity operable to receive a head of a golf club. The body also includes a first aperture accessing the cavity. The golf club cover also includes a turrethead mounted with respect to the body for rotation about an axis extending transverse to the first aperture.

5 Claims, 3 Drawing Sheets

(56) References Cited

FOREIGN PATENT DOCUMENTS

| DE | 202012102299 | U1 | 8/2012 |
| GB | 2242039 | A | 9/1991 |
| GB | 2357250 | A | 6/2001 |
| KR | 20150014181 | A | 2/2015 |

* cited by examiner

GOLF CLUB COVER

BACKGROUND OF THE INVENTION

1. Field of the Invention

The invention relates to golf club covers.

2. Description of Related Prior Art

U.S. Pub. No. 2012/0118452 discloses a GOLF CLUB COVER APPARATUS AND METHOD OF USE THEREOF. The '452 publication alleges that the invention disclosed therein comprises a combination golf club head cover and a golf club head cover pocket configured to hold, transport and/or secure an object, such as a watch, wallet, key, music device, and/or personal item. Optionally, the golf club head cover is configured with an integrated music device or a replaceably attachable music device. For example, a golf club cover and/or a novelty golf club system is configured with one or more music projection elements, such as a power source, receiver, power transmittal line, music source receiver, integrated music source, connector for a replaceably attached music source, music transmittal line, user controller, amplifier, and/or speaker. The system allows a golfer to safely transport and enjoy a music device while playing a round of golf and/or to enjoy the same music source while in an indoor area and/or a refreshment area where a bulky golf bag is not readily transported.

SUMMARY OF THE INVENTION

In summary, the invention is a golf club cover. The golf club cover includes a body defining a cavity operable to receive a head of a golf club. The body also includes a first aperture accessing the cavity. The golf club cover also includes a turrethead mounted with respect to the body for rotation about an axis extending transverse to the first aperture.

BRIEF DESCRIPTION OF THE DRAWINGS

The detailed description set forth below references the following drawings.

DETAILED DESCRIPTION OF EXEMPLARY EMBODIMENTS

Figure 1:
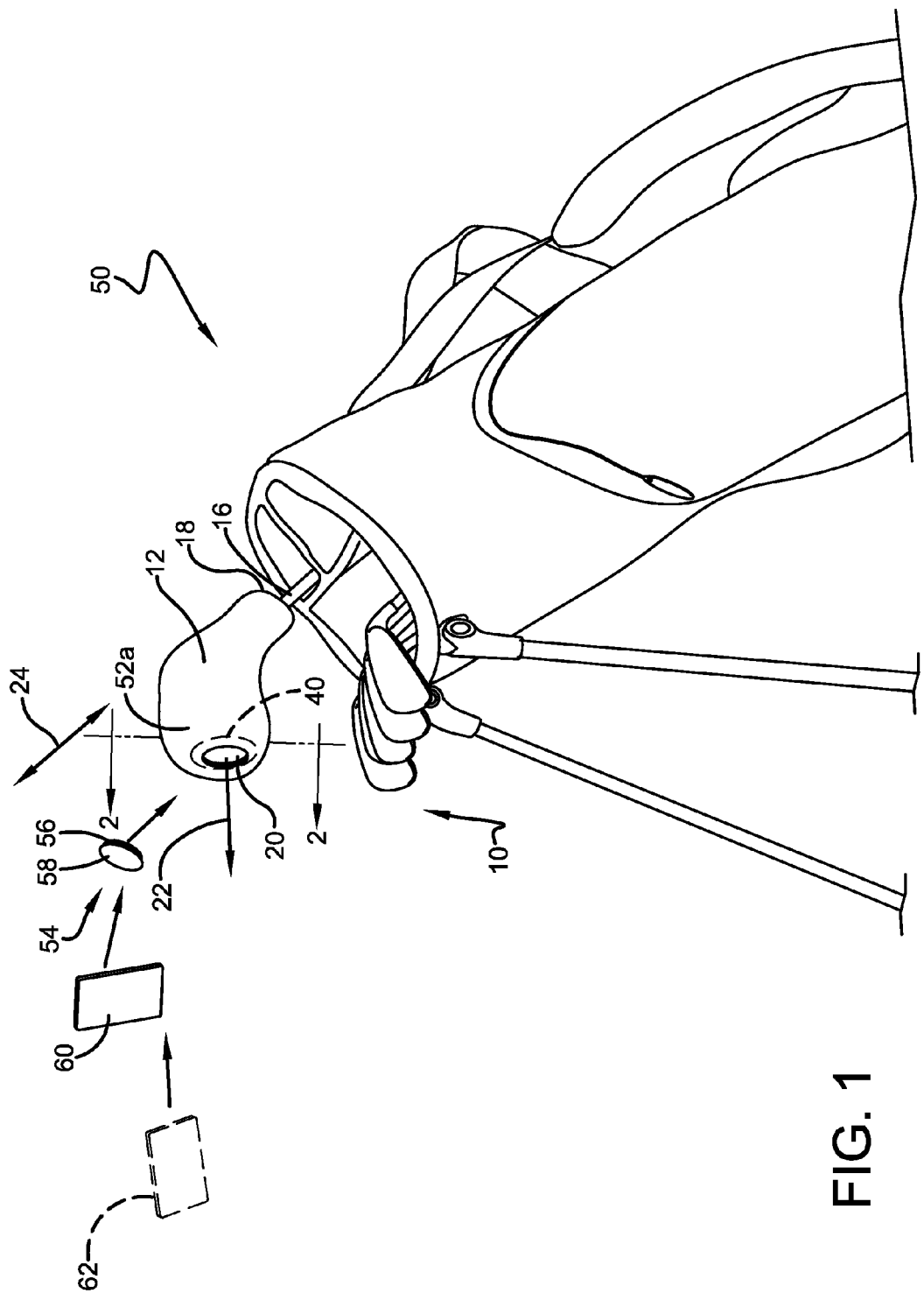
FIG. 1 is an exploded view of an exemplary embodiment of the invention in an exemplary operating environment.

A plurality of different embodiments of the invention is shown in the Figures of the application. Similar features are shown in the various embodiments of the invention. Similar features have been numbered with a common reference numeral and have been differentiated by an alphabetic suffix. Similar features are structured similarly, operate similarly, and/or have the same function unless otherwise indicated by the drawings or this specification. Furthermore, particular features of one embodiment can replace corresponding features in another embodiment or can supplement other embodiments unless otherwise indicated by the drawings or this specification.

The invention, as demonstrated by the exemplary embodiments described below, can provide assistance to a golfer. A camera can be mounted to a golf club so that the golfer can film his own swings on a course or at a driving range. In some embodiments, the golf club cover can include a built-in plastic rotational device that rests underneath an outer layer. A plug or protuberance molded on the plastic rotational device can project slightly out of the golf club cover, penetrating the center of the golf club cover's face. This can enable a smart phone camera to be attached with ease. Once the smart phone camera is attached, both the smart phone camera and the golf club cover can be adjusted effortlessly to achieve the ideal perspective on and footage of the golfer. The golf club cover can remain on the golf club as it rests in the golf bag without ever needing to be removed. The position of the golf club cover and camera angle positions can be tweaked as desired and recording can begin.

The inventor has observed that the large, protective and modern design of today's golf club covers, soft or rigid, can provide a surface area for mounting a camera. The faces of modern golf club golf club covers are often flat, which enables a plastic rotational device to remain flat. This can provide a consistent base for a smart phone camera mount.

As golf club technology continues to make the game more enjoyable and easy to play for the casual golfer, more people choose to take up the sport. These new golfers can be obsessed with honing their swings and enjoy utilizing their smart phone cameras to aid in helping them improve performance. At least some embodiments of the present invention allow a golfer to stand his bag on the ground behind his ball or beside his ball, adjust the golf club cover resting on his driver/fairway wood, and rotate the camera to the desired angle. After the shot, the golfer can pick up his bag and carry it to the ball while reviewing the footage from his last shot. A golfer need not carry along extra alignment sticks or attachable clamps or pegs to be stuck in the ground or on the side of the bag.

In at least some embodiments, the mounting structure for holding the camera to rotate can allow a desired camera angle regardless of the severity of the slope that the golf bag is resting on. In golf there is rarely a perfectly even spot on the course. Even at many outdoor driving ranges it is difficult to find a flat spot to stand a golf bag. At least some embodiments of the invention allow the camera to twist to a point where the footage looks perfectly level.

If a golfer wants to film one of his tee shots while swinging his driver/fairway wood, a golf club cover according to at least one embodiment of the broader invention can be securely fit onto any of his irons or woods in the golf bag. The golf club cover can be adjusted accordingly to meet the footage angle desired. The golf club cover can remain sturdy when a relatively heavy smart phone camera is attached and keep the smart phone in the desired position. The golf club cover can be easily adjusted (marginally pulled off the club), while also remaining tight to the club head. A golfer can also incrementally adjust the club positioning in the given bag so that the golf club cover is able to reach varying heights. For example, a club can be pulled two feet out of the golf bag, thus providing two feet in additional height above the top of the golf bag for the golf club cover to operate.

Some golfers may elect to include multiple embodiments of the invention in a single golf bag. For example, a golfer may have both a driver cover and fairway wood cover equipped with a rotating mount. He or she may quickly transfer the smart phone from one cover to the other when he or she needs to hit with either club. Also, the golf cover can be used even when the golf bag is strapped on a golf pull cart or power cart.

Referring now to FIG. 1, a golf club cover 10 according to one embodiment of the broader invention includes a body 12 defining a cavity 14 (not visible in FIG. 1). The cavity 14 is partially shown in FIG. 2 and is operable to receive a head of a golf club. The shaft of a golf club is referenced at 16 in FIG. 1. The body 12 also includes a first aperture 18 accessing the cavity 14. The head of the golf club can be inserted through the first aperture 18.

The golf club cover 10 also includes a turrethead 20 mounted with respect to the body 12. The turrethead 20 can rotate about an axis 22. The axis 22 extends transverse to the first aperture 18. The center axis of the first aperture 18 is referenced at 24 in FIG. 1. The exemplary axis 24 is collinear with a central axis of the shaft 16.

Figure 2:
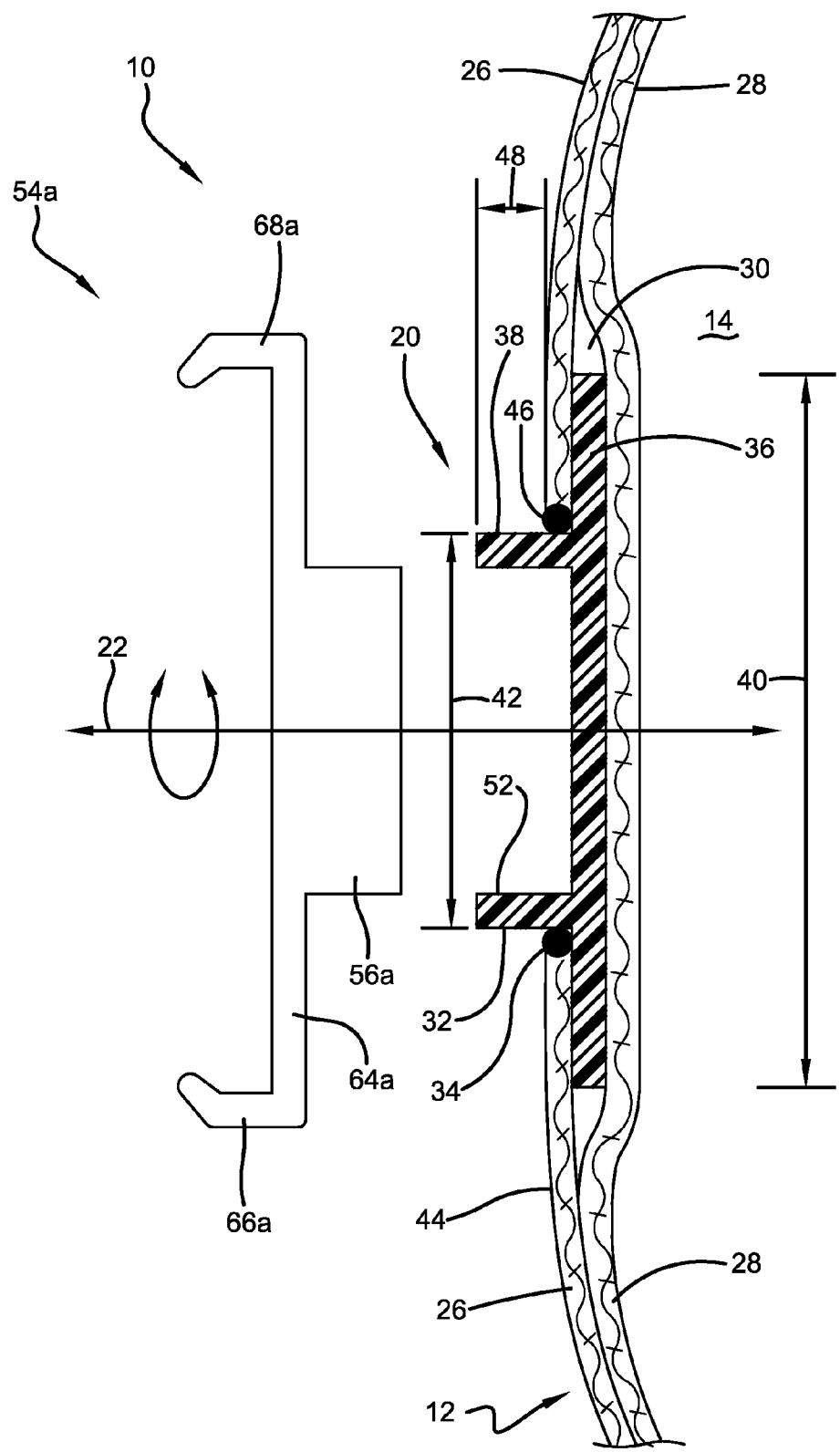
FIG. 2 is a partial cross-sectional view take along section lines 2-2 in FIG. 1.

In one or more embodiments of the broader invention, the body can be deformable. For example, the body can be formed from at least one textile. FIG. 2 shows that the exemplary body 12 can be formed by one or more layers of fabric, such as layers 26 and 28. A pocket 30 can be formed between the layers 26 and 28. The exemplary pocket 30 is isolated from the cavity 14 and the first aperture. A second aperture 32 can be formed in the fabric layer 26. The second aperture 26 can access the pocket 30 and is spaced from the first aperture 18. An elastic ring 34 can define the second aperture 32.

In one or more embodiments of the broader invention, the turrethead 20 can include a base 36 and protuberance 38. The base 36 can have a first diameter and be disposed in the pocket 30. The first diameter is referenced at 40. The protuberance 38 can have a second diameter and project from the base 36 through the second aperture 32. The second diameter is referenced at 42. The first diameter is larger than the second aperture 32. The base 36 is therefore captured in the pocket 30. The base 36 can rotate within the pocket in response to the application of turning force by a user. However, the one or more embodiments can be arranged such that the base 36 can remain in place if not subjected to turning force by a user. The surface of the base 36 can be modified to generate more or less friction with one or more of the layers 26, 28 of fabric.

The width of the protuberance 38 is the second diameter 42. The protuberance 38 can project above an outer surface 46 of the body 12 a height referenced at 48. The width/second diameter 42 is greater than the height 48. As a result, the turrethead 20 can be relatively flush with the outer surface 46 of the body 12. The turrethead 20 is thereby less likely to catch on other structures as the associated golf bag 50 is moved.

The golf club cover 10 can be part of a kit further comprising a carrier releasibly engageable with the turrethead 20. The carrier can interconnect a camera with the body 12. The turrethead 20 can define one of a female and male connection structure and the carrier can define the other of a female and male connection structure. The connection structures can form a releasable male-female connection between the carrier and the turrethead 20.

FIG. 1 shows a first embodiment of a carrier 54. The exemplary carrier 54 includes a male connection structure 56 being cylindrical. The turrethead 20 defines a female connection structure being an aperture 52. The male connection structure 56 can be received in the blind aperture 52 to releasibly interconnect the carrier 54 and the turrethead 20.

The carrier 54 and the turrethead 20 can be interconnected in a plurality of different angular orientations. Thus, a camera can be mounted in different orientations. FIG. 1 shows a smart phone 60 with a camera in a first angular orientation in solid line and a smart phone 62 with a camera in a second, different angular orientation in phantom. However, the connection can also ensure a fixed interconnection between the carrier 54 and the turrethead 20 in each of the plurality of different angular orientations so that while the connection is made, the carrier 54 will not rotate (slip) relative to the turrethead 20.

The carrier 54 can include a cap 58 having a third diameter larger than the female connection of the turrethead 20, the diameter 42. The cap 58 can thus limit the insertion of the male connection 56 in the aperture 52. In one or more embodiments of the broader invention, the aperture 52 can be a blind aperture. As a result, the depth of the blind aperture 52 can also limit the insertion of the male connection 56 in the aperture 52.

FIG. 2 shows an alternative embodiment of a carrier 54a. The carrier 54a includes a connection portion being a male connection 56a. The carrier 54a also includes a plate portion 64a fixed to the connecting portion 56a. The carrier 54a also includes first and second arms 66a, 68a projecting from opposite sides of the plate portion 64a. A smart phone can be held between the arms 66a, 68a, against the plate portion 64a. The carrier 54a can rotate about the axis 22 to orient the carrier 54a and smart phone be carried as desired. Rotation of the carrier 54a can occur before the carrier 54a is engaged with the turrethead 20. Alternatively, the carrier 54a and turrethead 20 can be interconnected and then the two structures can be rotated together to a preferred angular orientation.

The connecting portion 56a, the plate portion 64a, and the first and second arms 66a, 68a can be integrally-formed with respect to one another. "Integrally-formed" refers to the fact that in the exemplary embodiment the [parts] are formed together rather than being formed separately and then subsequently joined. The term defines a structural feature since structures that are integrally-formed are structurally different than structures that are comprised of subcomponents formed separately and then subsequently joined. "Integral" means consisting or composed of parts that together constitute a whole and thus encompasses structures of more than one part wherein the parts are either integrally-formed or formed separately and then subsequently joined.

Figure 3:
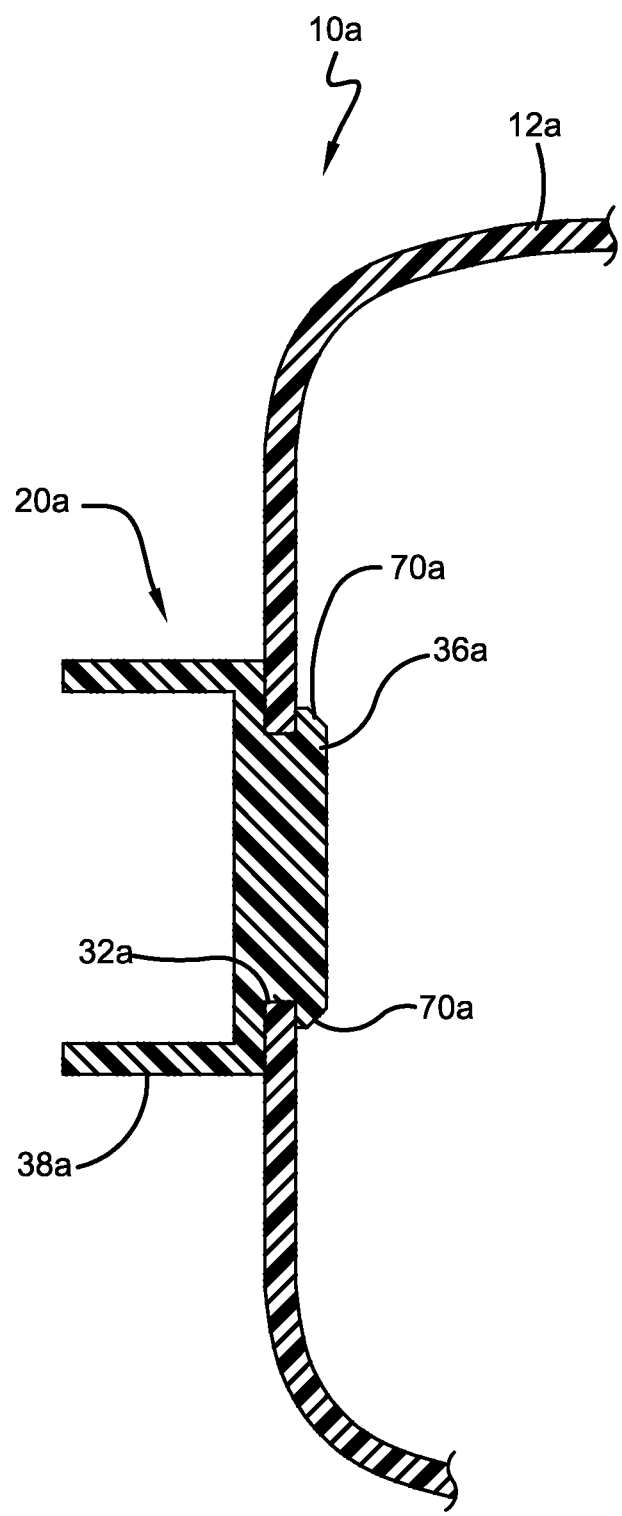
FIG. 3 is a partial cross-sectional view analogous to FIG. 2 but of another exemplary embodiment of the invention.

FIG. 3 is a partial cross-sectional view of another exemplary embodiment of the invention. A golf club cover 10a includes a body 12a that is rigid. The golf club cover 10a can be a cover for an iron. The golf club cover 10a also includes a turrethead 20a. The body 12a and the turrethead 20a can engage one another in a snap-fit relationship. A base 36a of the turrethead 20a can include a chamfer 70a that can elastically deform the body 12a during insertion through an aperture 32a. The body 12a can snap back into an original shape after the chamfer 70a clears the aperture 32a. The body 12a can be pressed between the base 36a and the protuberance 38a, permitting rotation by the user but preventing rotation otherwise.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Further, the "invention" as that term is used in this document is what is claimed in the claims of this document. The right to claim elements and/or sub-combinations that are disclosed herein as other inventions in other patent documents is hereby unconditionally reserved.

What is claimed is:

1. A kit comprising:
a body defining a cavity operable to receive a head of a golf club and a first aperture accessing said cavity and centered on a first axis, said body having a plurality of layers including at least a first layer and a second layer, said body further having a pocket positioned between said first layer and second layer, said second layer separating said pocket from said cavity, said body further having a second aperture in said first layer centered on a second axis transverse to said first axis, and said second aperture communicating with said pocket;
a turrethead mounted with respect to said body for rotation about an axis extending transverse to said first aperture, said turrethead including a base and a protuberance extending from said base, said protuberance extending through said second aperture in said first layer, and said base having a width wider than a diameter of said second aperture and thereby captured in said pocket; and
a carrier releasably engaged with said turrethead, wherein said carrier further comprises a connection portion, a plate portion fixed to said connection portion, and first and a second arms projecting from opposite sides of said plate portion.

2. The kit of claim 1 wherein:
said turrethead defines one of a female and male connection structure of said connection portion; and
said carrier defines the other of a female and male connection structure of said connection portion, said female and male connection structures forming a releasible male-female connection between said carrier and said turrethead.

3. The kit of claim 2 wherein said male-female connection between said carrier and said turrethead permits interconnection between said carrier and said turrethead in a plurality of different angular orientations.

4. The kit of claim 1 wherein:
said turrethead defines a female connection structure of said connection portion being a blind aperture; and
said carrier defines a male connection structure of said connection portion being cylindrical, said female and male connection structures forming a releasible male-female connection between said carrier and said turrethead.

5. The kit of claim 1 wherein said connection portion and said plate portion and said first and second arms are integrally-formed with respect to one another.

* * * * *